(12) United States Patent
Hasebe et al.

(10) Patent No.: US 6,834,886 B2
(45) Date of Patent: Dec. 28, 2004

(54) AIRBAG DEVICE

(75) Inventors: Masahiro Hasebe, Hikone (JP); Yukitoshi Narimoto, Omihachiman (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 10/693,101

(22) Filed: Oct. 27, 2003

(65) Prior Publication Data

US 2004/0160048 A1 Aug. 19, 2004

(30) Foreign Application Priority Data

Feb. 18, 2003 (JP) ........................................ 2003-039895

(51) Int. Cl.[7] .............................................. B60R 21/16
(52) U.S. Cl. .................................................. 280/743.1
(58) Field of Search ........................... 280/743.1, 730.1, 280/728.2, 731, 732

(56) References Cited

U.S. PATENT DOCUMENTS

| | | | |
|---|---|---|---|
| 3,792,873 A | | 2/1974 | Buchner et al. |
| 5,125,682 A | * | 6/1992 | Hensler et al. ............ 280/730.1 |
| 5,213,361 A | | 5/1993 | Satoh et al. |
| 6,505,851 B2 | * | 1/2003 | Frisch ........................ 280/728.3 |
| 6,536,801 B2 | * | 3/2003 | Frisch ........................ 280/743.1 |
| 6,540,254 B2 | * | 4/2003 | Bieber et al. ................. 280/732 |
| 6,554,317 B2 | * | 4/2003 | Lorenz et al. ............. 280/743.1 |
| 6,588,798 B2 | * | 7/2003 | Bohn et al. ................ 280/743.1 |
| 6,595,549 B2 | * | 7/2003 | Bohn et al. ................ 280/743.1 |
| 6,726,245 B2 | * | 4/2004 | Fellhauer et al. .......... 280/743.2 |
| 2002/0084631 A1 | * | 7/2002 | Lorenz et al. ............. 280/728.2 |
| 2002/0084638 A1 | * | 7/2002 | Neupert .................... 280/743.1 |
| 2002/0084640 A1 | * | 7/2002 | Bohn ........................ 280/743.1 |
| 2002/0084641 A1 | * | 7/2002 | Fellhauer et al. ......... 280/743.1 |
| 2002/0195809 A1 | * | 12/2002 | Bieber et al. ............. 280/743.1 |
| 2003/0218325 A1 | * | 11/2003 | Hasebe et al. ............ 280/743.2 |
| 2003/0230883 A1 | * | 12/2003 | Heym ....................... 280/743.1 |

FOREIGN PATENT DOCUMENTS

| | | |
|---|---|---|
| JP | 47-2361 | 2/1972 |
| JP | 47-21783 | 7/1972 |
| JP | 47-30044 | 11/1972 |
| JP | 47-30045 | 11/1972 |
| JP | 3-32956 | 2/1991 |
| JP | 4-9349 | 1/1992 |
| JP | 4-55141 | 2/1992 |
| JP | 4-201644 | 7/1992 |
| JP | 4-292239 | 10/1992 |
| JP | 5-178146 | 7/1993 |
| JP | 7-285408 | 10/1995 |

* cited by examiner

*Primary Examiner*—Faye M. Fleming
(74) *Attorney, Agent, or Firm*—Manabu Kanesaka

(57) ABSTRACT

An airbag device has an airbag and an inflator for inflating the airbag. The inflator disposed at a base side of the airbag ejects gas to inflate the airbag such that a distal end of the airbag moves away from the base side of the airbag. The airbag includes a left half airbag to be inflated at a front left side of a vehicle occupant and a right half airbag to be inflated at the front right side of the occupant. Distal ends of the left and right half airbags are separated by a space facing the occupant when the airbag is inflated. The left and right half airbags have primary folded portions having vertically elongated folded states. The left and right half airbags also have secondary folded portions having vertically folded states to form a finally folded state.

11 Claims, 14 Drawing Sheets

AIRBAG DEVICE

BACKGROUND OF THE INVENTION AND RELATED ART STATEMENT

The present invention relates to an airbag device for protecting an occupant in the event of, for example, a vehicle collision. In particular, the present invention relates to an airbag device having an airbag including left and right half airbags to be inflated at front left and front right sides of the occupant, respectively.

Japanese Patent Publication (Kokai) No. 04-292239 has disclosed an airbag for protecting a vehicle occupant in the event of a vehicle collision. The airbag has a left half airbag to be inflated at a front left side of the occupant, and a right half airbag to be inflated at a front right side of the occupant. A common inflator inflates both the left half and right half airbags. In the airbag, a distal end of the left half airbag is connected to a distal end of the right half airbag with a tie panel.

The airbag is folded in a case and covered with a cover. In the event of a vehicle collision, the inflator, i.e. a gas generator, ejects gas to inflate the airbag rapidly in front of the occupant by pushing and opening the cover.

The inflator is disposed at an inside or outside of a base portion of the airbag. In an airbag device having an inflator disposed at an outside of the base portion of the airbag, the gas from the inflator is supplied into the airbag through a gas inlet disposed at the base portion side of the airbag. In an airbag device having an inflator disposed at an inside of the base portion side of the airbag, the inflator is entirely or partially disposed in the airbag. An example of the latter case includes a configuration in which a pair of slit openings is formed in the airbag, and a rod inflator passes through the slit openings, so that both ends of the inflator expose at the outside of the airbag.

In the airbag disclosed in Japanese Patent Publication (Kokai) No. 04-292239, the distal ends of the left half and right half airbags are connected with the tie panel. Therefore, when the airbag is inflated, the tie panel receives a center part of the vehicle occupant body in the lateral direction. When the left half and right half airbags are inflated, a larger amount of the gas may flow in one of the half airbags from the inflator, and then the other of the half airbags may be inflated later than the one of the half airbags. As described above, the distal ends of the left and right half airbags are connected with the tie panel. Accordingly, it is expected that when one of the half airbags is inflated faster than the other, the one of the half airbags may facilitate the other of the half airbags to be inflated by pulling the other of the half airbags through the tie panel.

As described above, however, the tie panel connects the distal ends of the left and right half airbags. Therefore, the one of the half airbags does not sufficiently pull the other of the half airbags through the tie panel until the one of the half airbags is inflated up to the distal end.

In view of the problem described above, an object of the present invention is to provide an airbag device including left and right half airbags for receiving the left and right sides of the occupant thorax, and a space between the inflated half airbags faces a center part of the occupant thorax in a horizontal direction.

Another object of the present invention is to provide an airbag, wherein the left half airbag and the right half airbag are inflated smoothly and substantially uniformly toward left and right sides from an early stage of the inflation.

Further objects and advantages of the invention will be apparent from the following description of the invention.

SUMMARY OF THE INVENTION

According to the present invention, an airbag device has an airbag in a folded state and an inflator for inflating the airbag. The inflator disposed at a base side of the airbag ejects gas to inflate the airbag such that a distal end of the airbag moves away from the base side of the airbag. The airbag includes a left half airbag to be inflated at a front left side of a vehicle occupant and a right half airbag to be inflated at the front right side of the occupant. Distal ends of the left and right half airbags are separated by a space facing the occupant when the airbag is inflated. The left and right half airbags have primary folded portions having vertically elongated folded states, which are then folded to have secondary folded portions having small vertically folded states to form a final folded state.

In the present invention, when the inflator inflates the airbag, the left and right half airbags receive the left and right sides of the occupant thorax having hard and strong ribs. The airbag receives and absorbs an impact from the occupant through the ribs. The inflated airbag has the space between the distal ends of the left and right half airbags. The space faces the occupant around breastbone in the center of the occupant thorax. Therefore, when the occupant body plunges into the airbag, the breastbone does not receive a large impact from the airbag, thereby reducing a load around the breastbone.

In the present invention, the airbag preferably has a distance of 150 to 350 mm between the distal ends of the left and right half airbags in the inflated state. With this arrangement, the left half airbag faces a left center of the occupant thorax and the right half airbag faces a right center of the occupant thorax, thereby securely receiving the occupant body around the ribs.

In the present invention, the airbag has the primary folded portions having a vertically elongated folded state, which is then folded to have the secondary folded portions in the final folded state. Therefore, in operating the inflator, the left and right half airbags are expanded vertically from a relatively early stage, and then expanded toward the occupant. Accordingly, it is possible to increase a first contact area, i.e. an area of the airbag contacting the occupant first.

According to the present invention, at least a part of the primary folded portion may have a rolled up portion. The rolled up portion of the left half airbag is rolled up clockwise, and the rolled up portion of the right half airbag is rolled up counterclockwise viewed from above. When the airbag is inflated, the left half airbag is deployed toward the left side of the occupant thorax from the front left side to wrap the left side of the occupant thorax. The right half airbag is deployed toward the right side of the occupant thorax from the front right side to wrap the right side of the occupant thorax. As a result, the airbag wraps and receives the occupant head from the front left and right sides of the occupant.

According to the present invention, the primary folded portions of the airbag may be folded into bellows. With such an arrangement, the left and right half airbags are deployed toward the front of the occupant to receive the left and right sides of the occupant thorax.

According to the present invention, the secondary folded portions may be separately formed at top and bottom halves of the primary folded portion. Accordingly, it is possible to adjust sizes of the folded portions at the top and bottom halves of the airbag. For example, when the top half of the secondary folded portion has a size larger than that of the bottom half of the secondary folded portion, the top halves of the left and right half airbags are inflated larger than the bottom halves of the left and right half airbags at the initial stage. As a result, the left and right half airbags approach the occupant with surfaces thereof facing the occupant in a vertical state, thereby increasing the first contact area.

According to the present invention, a common inflator may be provided for ejecting the gas to inflate the left and right half airbags. Accordingly, it is possible to reduce the number of the inflators and a production cost.

According to the present invention, the left and right half airbags may be connected with a connecting portion at midsections thereof in a direction that the airbag is inflated. With such an arrangement, when one of the half airbags is inflated slower than the other of the half airbags during the inflation, the other of the half airbags pulls the one of the half airbags to facilitate the inflation of the airbag. The left and right half airbags are connected with the connecting portion at the midsections thereof in the direction of the inflation. Accordingly, the other of the half airbags starts to pull the one of the half airbags when the other of the half airbags is inflated up to the midsection from a relatively initial stage of the inflation. As a result, both the left and right half airbags can be inflated smoothly and substantially uniformly from the initial stage of the inflation.

According to the present invention, the left and right half airbags may be connected with the connecting portion at the midsections thereof in the direction of the inflation. When the primary folded portions are formed, distal portions of the left and right half airbags from the connecting portion are folded in opposite directions along first fold lines on the connecting portion in a vertical direction. Base portions of the left and right half airbags from the first fold lines are folded along third fold lines between the connecting portion and the bases of the left and right half airbags such that the second fold lines move away from each other. The second fold lines between the third fold lines and the bases of the left and right half airbags are overlapped with the first fold lines. The distal portions from the second fold lines are overlapped with each other and rolled up. The base portions from the second fold lines are folded into bellows.

The primary folded portions have the bellows at the folded base portions from the third fold lines. When the airbag is inflated, the bellows are quickly inflated and then the rolled portions are inflated to wrap the occupant from the front left and right sides.

BRIEF DESCRIPTION OF THE DRAWINGS

FIGS. 1(a) and 1(b) are views showing a structure of an airbag according to an embodiment of the present invention, wherein FIG. 1(a) is a perspective view of the airbag in an inflated state, and FIG. 1(b) is a sectional view taken along line 1(b)—1(b) in FIG. 1(a);

FIGS. 3(a) and 3(b) are perspective views of the airbag shown in FIG. 1(a), wherein FIG. 3(a) is an exploded perspective view of the airbag, and FIG. 3(b) is an enlarged view of a section 3(b) shown in FIG. 3(a);

FIGS. 14(a) and 14(b) are plan views showing the process of inflating the airbag shown in FIG. 1(a), wherein FIG. 14(a) shows a state in which the left and right half airbags contact an occupant, and FIG. 14(b) shows the left and right half airbags in a completely inflated state;

FIGS. 18(a) and 18(b) are views showing an airbag device according to a further embodiment of the present invention, wherein FIG. 18(a) is a perspective view of a primary folded portion 10B of the airbag having a top half longer than a bottom half, and FIG. 18(b) is a sectional view of the airbag device taken along line 18(b)—18(b) in FIG. 18(a);

DETAILED DESCRIPTION OF PREFERRED EMBODIMENTS

Figure 1A:
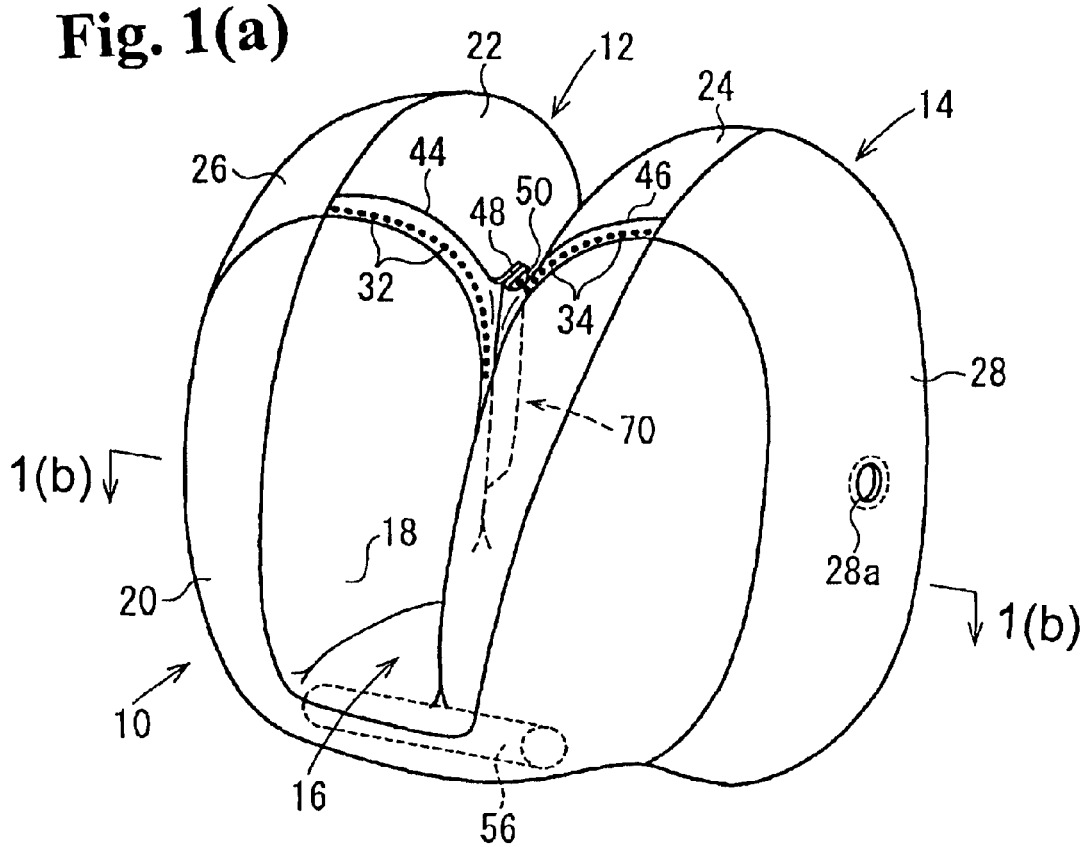
Figure 1B:
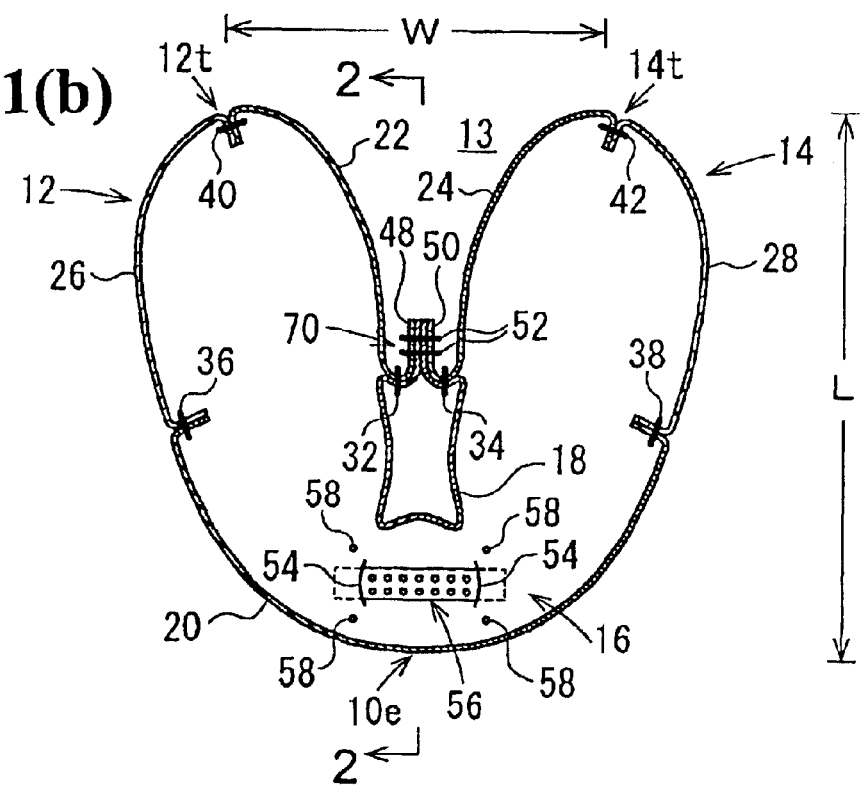
Figure 2:
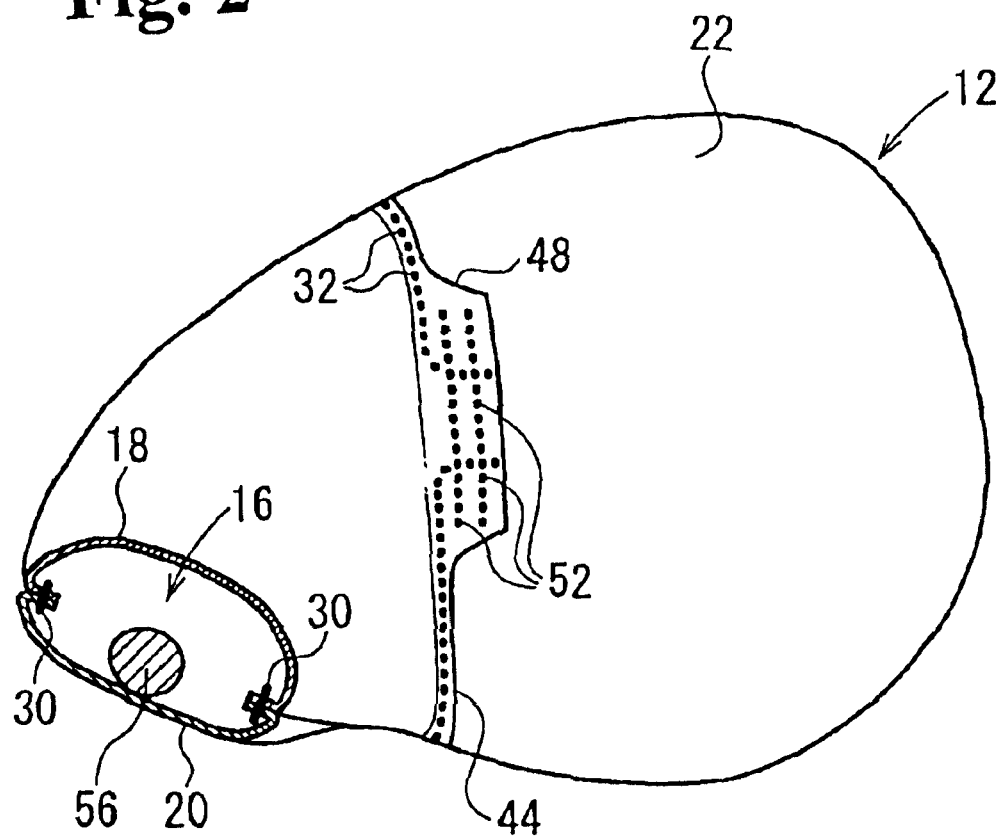
FIG. 2 is a sectional view of the airbag taken along line 2—2 in FIG. 1(b)
Figure 3A:
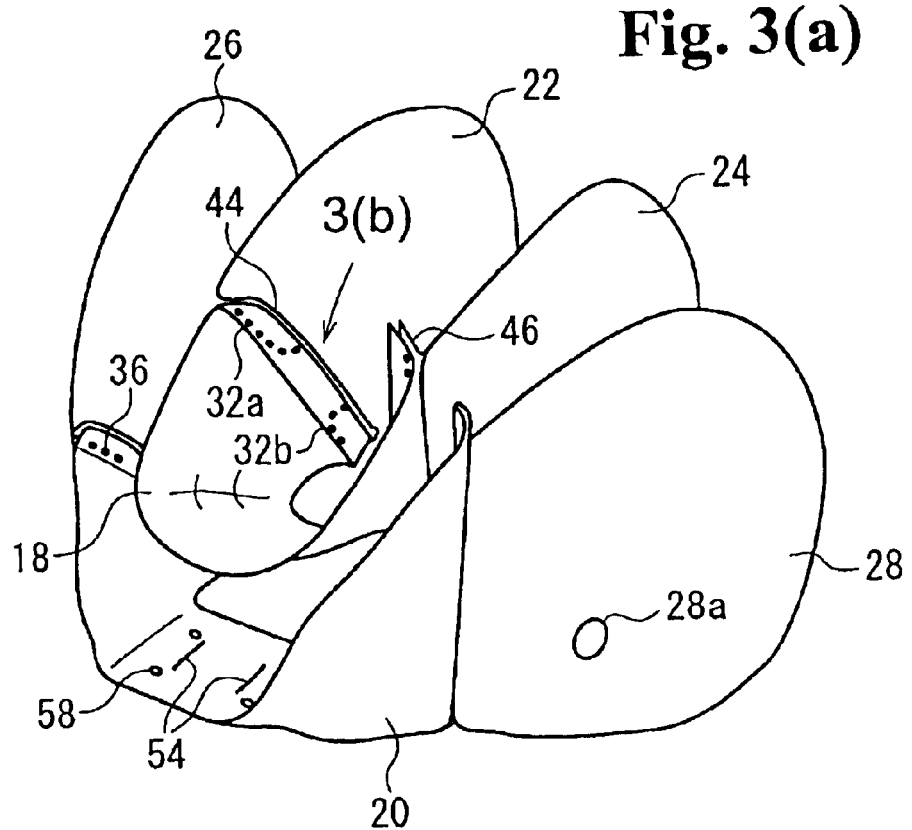
Figure 3B:
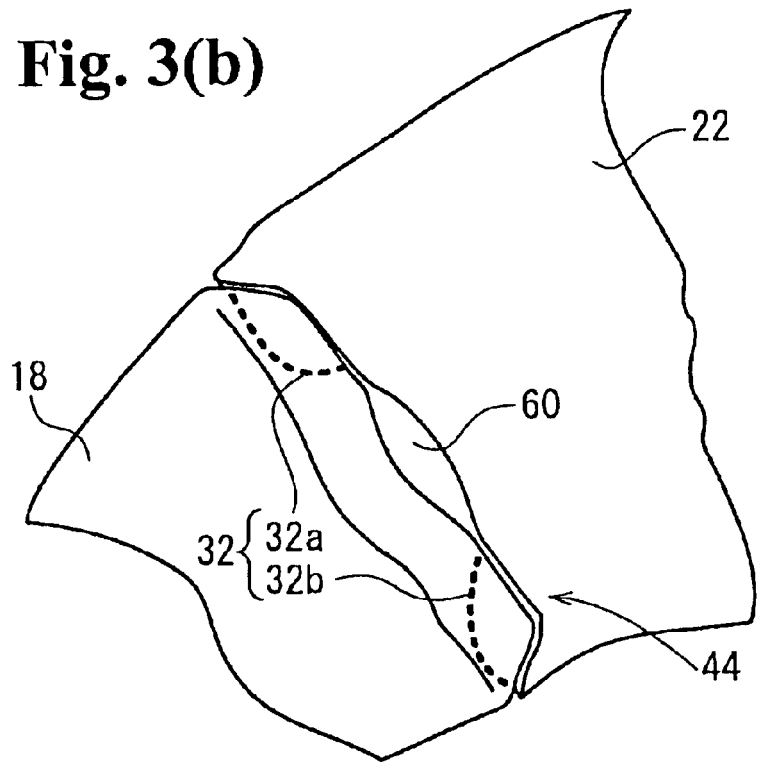

Hereunder, embodiments of the present invention will be described with reference to the accompanying drawings. FIG. 1(a) is a perspective view of an airbag according to an embodiment of the present invention in an inflated state, and FIG. 1(b) is a sectional view taken along line 1(b)—1(b) in FIG. 1(a). FIG. 2 is a sectional view of the airbag taken along line 2—2 in FIG. 1(a). FIGS. 3(a) and 3(b) are perspective views of the airbag shown in FIG. 1(a), wherein FIG. 3(a) is an exploded perspective view of the airbag, and FIG. 3(b) is an enlarged view of a section 3(b) shown in FIG. 3(a).

Figure 12:
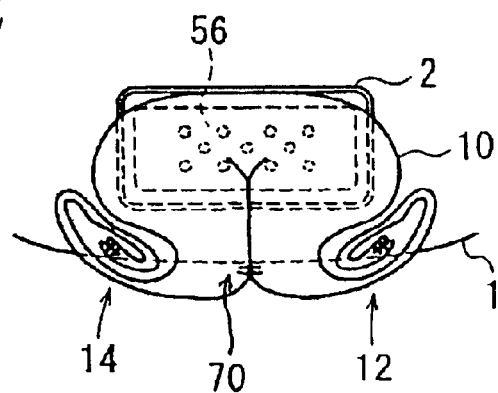
FIG. 12 is a plan view showing a process of inflating the airbag shown in FIG. 1(a)
Figure 12:
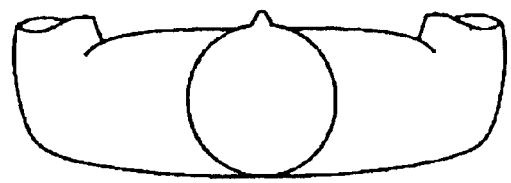
Figure 13:
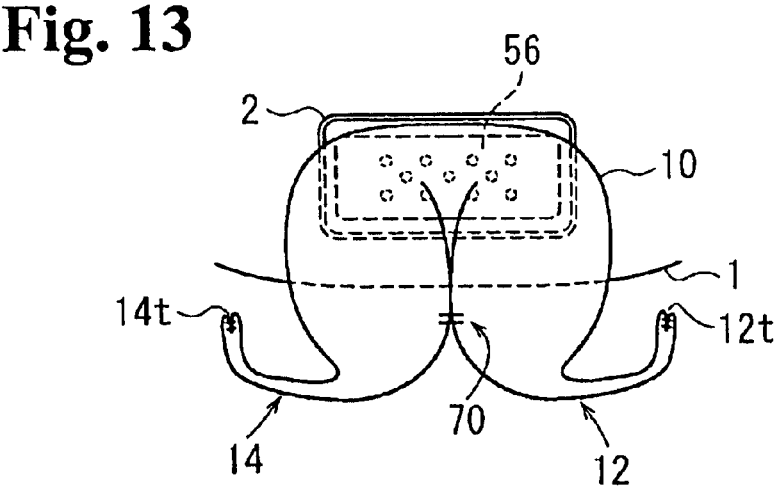
FIG. 13 is a plan view showing the process of inflating the airbag shown in FIG. 1(a)
Figure 13:
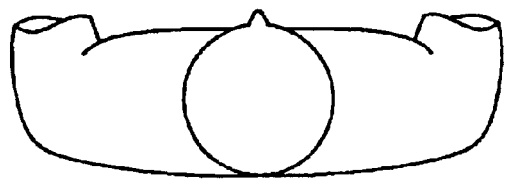
Figure 14A:
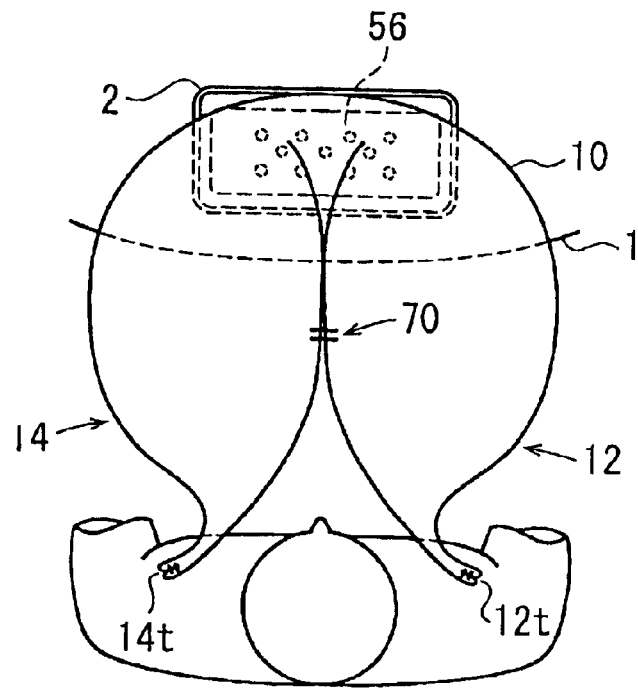
Figure 14B:
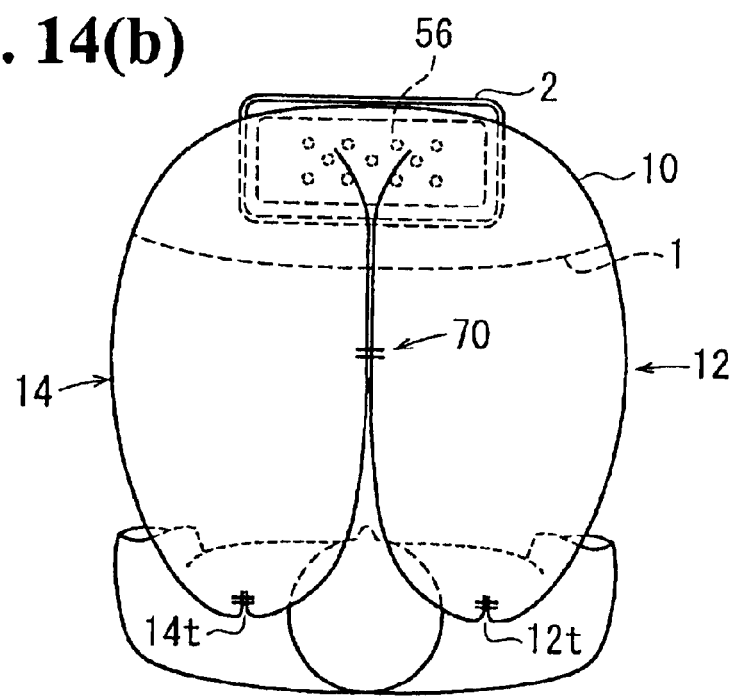

FIGS. 4 to 11 are perspective views showing a process of folding the airbag. FIGS. 12 to 14(a) and 14(b) are views showing a process of inflating the airbag, wherein FIG. 14(a) shows a state in which left and right half airbags contact an occupant, and FIG. 14(b) shows the left and right half airbags in a completely inflated state.

An airbag 10 has a right half airbag 12 to be inflated at the front right side of the occupant, a left half airbag 14 to be inflated at the front left side of the occupant, and a communicating portion 16 for communicating end portions of the right half airbag 12 and the left half airbag 14. The communicating portion 16 forms a base of the airbag 10. Thus, the right half airbag 12 and the left half airbag 14 are inflated away from the communicating portion 16.

When the airbag 10 is inflated, the right half airbag 12 and the left half airbag 14 have distal ends separated by a space 13 facing the occupant (upward in FIG. 1(b)) without a connecting member such as a tie panel therebetween.

When the airbag 10 is inflated, a distal end 12t of the right half airbag 12 is preferably away from a distal end 14t of the left half airbag 14 by a distance W of 150 to 350 mm, more preferably 170 to 330 mm.

The airbag 10 has a connecting portion 70 that connects the right half airbag 12 and the left half airbag 14 with a seam 52 at midsections thereof in a direction that the airbag is inflated.

In this embodiment, the airbag 10 includes panels 18, 20, 22, 24, 26, and 28 stitched together. A process of stitching the panels will be described in detail next. As shown in FIG. 3(a), the panel 18 (rear inner panel) constitutes surfaces of the right half airbag 12 and the left half airbag 14 behind the midsections thereof in the direction of the inflation and a center surface of the communicating portion 16. The panel 20 (rear outer panel) constitutes a surface opposite to the rear inner panel 18 (the outer surface of the airbag).

The panels 22 and 24 (front inner panels) constitute inner surfaces of the right half airbag 12 and the left half airbag 14 in front of the midsections thereof in the direction of the inflation (opposing surfaces of the right half airbag 12 and the left half airbag 14). The panels 26 and 28 (front outer panel) constitute surfaces opposite to the front inner panels 22 and 24 (the outer surfaces of the airbag), respectively.

Reference numeral 30 indicates seams (sewing threads) of the rear inner panel 18 and the rear outer panel 20; reference numeral 32 indicates a seam of the rear inner panel 18 and the front inner panel 22; reference numeral 34 indicates a seam of the rear inner panel 18 and the front inner panel 24; reference numeral 36 indicates a seam of the rear outer panel 20 and the front outer panel 26; and reference numeral 38 indicates a seam of the rear outer panel 20 and the front outer panel 28.

A bent hole 28a for the left half airbag is formed in the front outer panel 28. The front outer panel 26 has a bent hole 26a, similar to the bent hole 28a, for the right half airbag (see FIG. 4).

As shown in FIG. 1(a), seam allowances 44 and 46 (joint allowances) between the rear inner panel 18 and the front inner panels 22 and 24 are disposed outside the right half airbag 12 and the left half airbag 14, respectively. As shown in FIGS. 1(a) and 2, the seam allowances 44 and 46 have joint allowances 48 and 50 having a tongue shape, respectively (only the joint allowance 48 is shown in FIG. 2). As shown in FIG. 1(b), seams 52 connect the joint allowances 48 and 50 to form the connecting portion 70.

As described above, the seam allowances 44 and 46 between the rear inner panel 18 and the front inner panels 22 and 24 connect the right half airbag 12 and the left half airbag 14 at the midsections of the opposite surfaces thereof in the direction of the inflation.

In the inflated airbag 10, a distance between a rear end 10e and the connecting portion 70 is preferably about 30% to 70%, more preferably about 40% to 55%, of a front-to-rear length L.

The rear outer panel 20 constituting the outer surface of the communicating portion 16 has a pair of slits 54 for holding a rod-shaped inflator 56, as shown in FIGS. 1(a) and 1(b). The slits 54 hold the inflator 56 passing through the communicating-portion 16 in the width direction of a vehicle. Both ends of the inflator 56 protrude from the airbag 10.

The airbag 10 is installed in an airbag device for protecting the occupant in case of a vehicle collision. The airbag device has a box case 2 for accommodating the airbag 10 connected to the case 2 (see FIGS. 4 to 11). As shown in FIG. 1(b), fasteners such as bolts (not shown) pass through holes 58 to connect the airbag 10 to the case 2. Both ends of the inflator 56 are disposed inside the case 2.

In the airbag device, the airbag 10 is folded and accommodated in the case 2, and a cover such as a lid (not shown) covers the folded airbag. When the airbag 10 is inflated, the airbag 10 pushes and breaks the lid to open. The airbag device is installed on a top surface of an instrument panel 1 in front of a passenger seat in the vehicle (see FIGS. 12 to 14(a) and 14(b)).

A process of folding the airbag 10 will be described with reference to FIGS. 4 to 11. For the sake of the description, views in FIGS. 8 to 11 are enlarged about 1.2 times larger than views in FIGS. 4 to 7.

Figure 4:
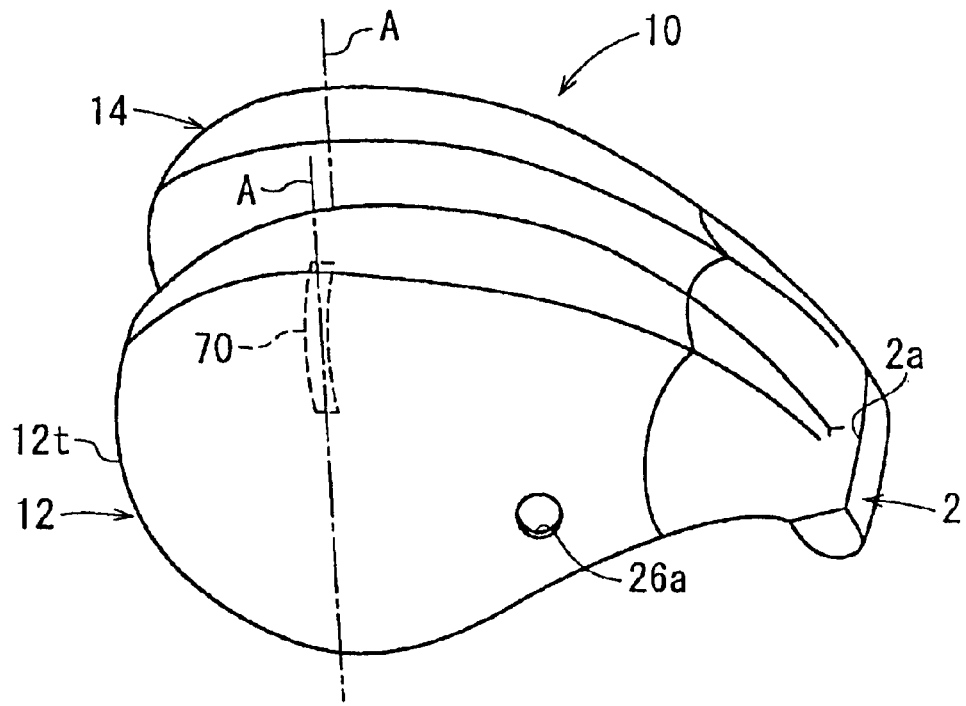
FIG. 4 is a perspective view showing a process of folding the airbag shown in FIG. 1(a)
Figure 5:
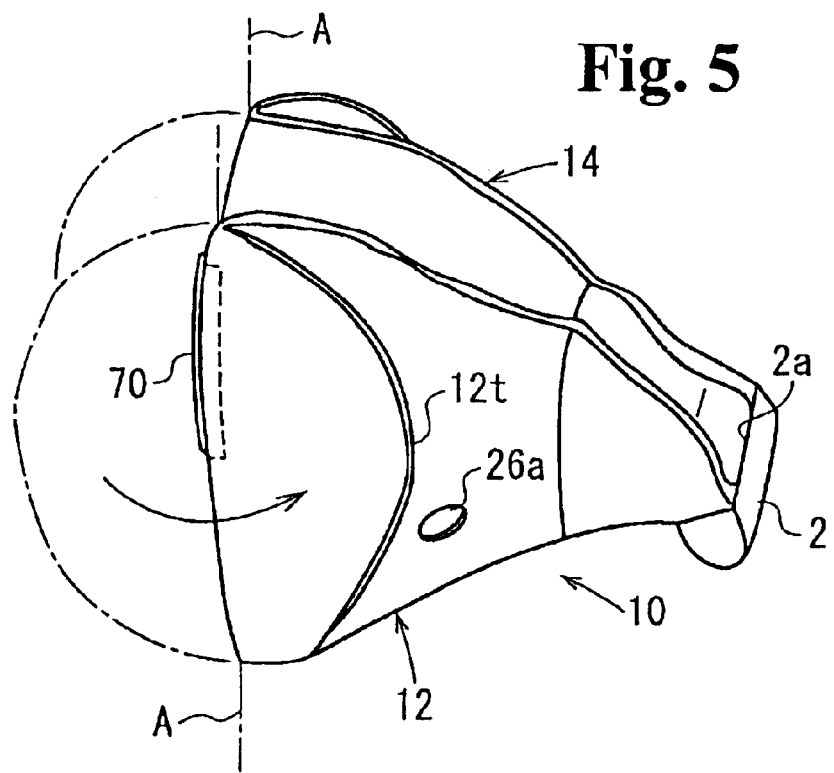
FIG. 5 is a perspective view showing the process of folding the airbag shown in FIG. 1(a)

As shown in FIG. 4, when the airbag 10 is unfolded, the opposing surfaces (connected with the connecting portion 70) of the right half airbag 12 and the left half airbag 14 are overlapped. As shown in FIG. 5, the airbag 10 is folded along fold lines A (first fold lines) along the connecting portion 70 such that distal portions of the right half airbag 12 and the left half airbag 14 from the connecting portion 70 move away from each other.

Figure 6:
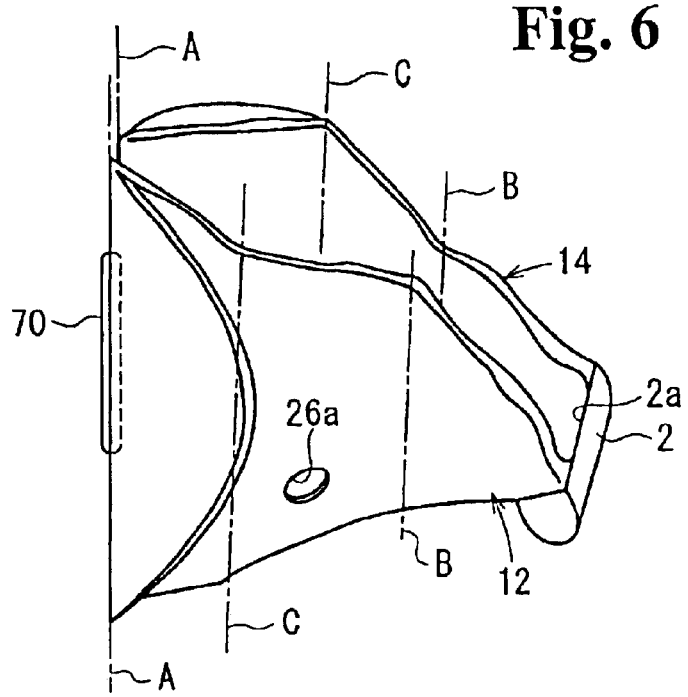
FIG. 6 is a perspective view showing the process of folding the airbag shown in FIG. 1(a)

As shown in FIG. 6, base portions of the right half airbag 12 and the left half airbag 14 from the fold lines A are folded along ,fold lines C (third fold lines) between the connecting portion 70 and the base portions of the right half airbag 12 and the left half airbag 14 such that the fold lines C move away from each other. That is, the right half airbag 12 and the left half airbag 14 are folded along fold lines B (second fold lines) between the fold lines C and the base portions thereof such that portions between the fold lines B and C move away from each other. At this time, the right half airbag 12 and the left half airbag 14 are folded along the fold lines C such that the portions between the fold lines C and A move away from each other.

The airbag 10 preferably has a distance from the rear end 10e to the fold lines B of about 20% to 40% of that from the rear end 10e to the connecting portion 70. The fold lines C lie midway between the fold lines B and A (the connecting portion 70).

Figure 7:
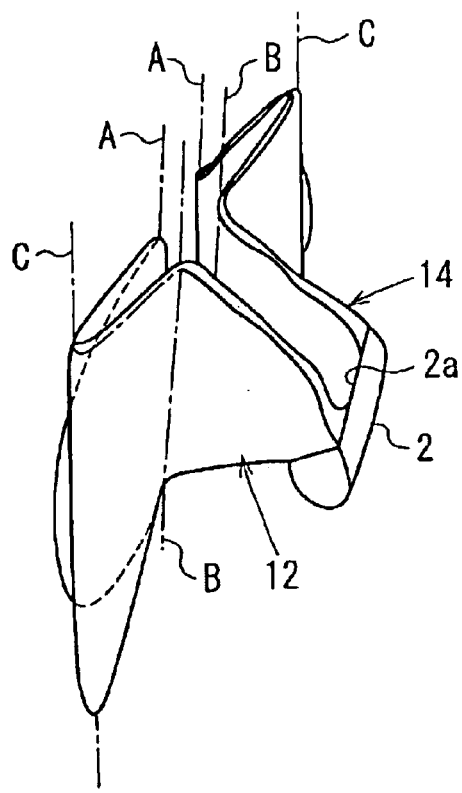
FIG. 7 is a perspective view showing the process of folding the airbag shown in FIG. 1(a)

As shown in FIG. 7, the fold line A of the right half airbag 12 is overlapped with the fold line B thereof, and similarly, the fold line A of the left half airbag 14 is overlapped with the fold line B thereof. Also, portions between the fold lines B and C of the right half airbag 12 and the left half airbag 14 are overlapped with the portions between the fold lines C and A thereof, respectively.

Figure 8:
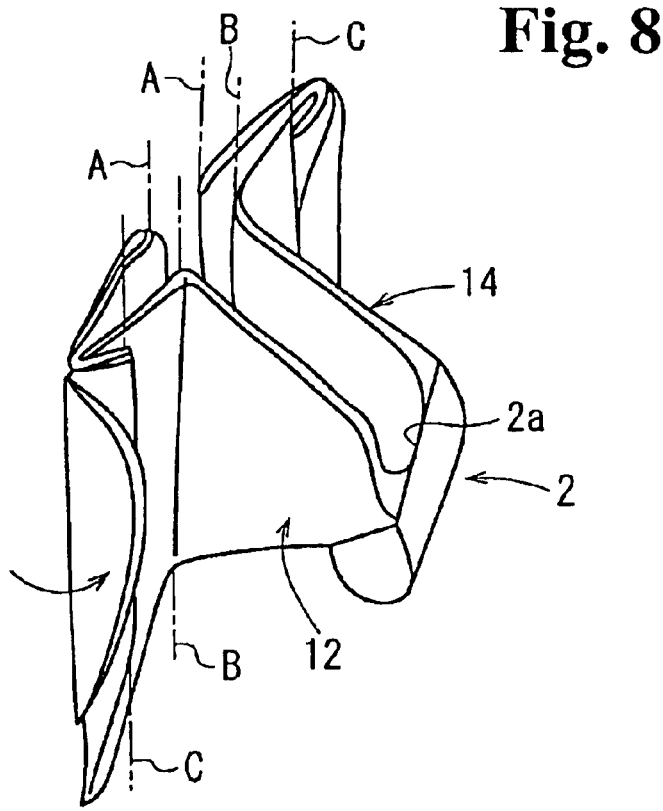
FIG. 8 is a perspective view showing the process of folding the airbag shown in FIG. 1(a)
Figure 9:
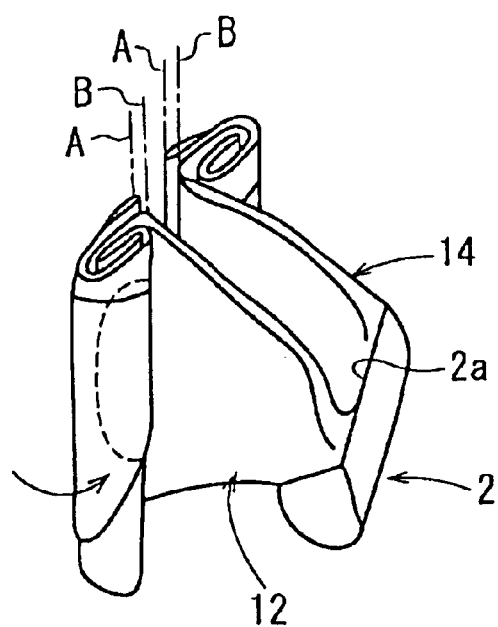
FIG. 9 is a perspective view showing the process of folding the airbag shown in FIG. 1(a)

As shown in FIGS. 8 and 9, the distal portions of the right half airbag 12 and the left half airbag 14 are rolled up from the fold lines C to A and B such that surfaces of the distal portions facing the base portions of the right half airbag 12 and the left half airbag 14 are rolled up. As shown in FIG. 12, when viewed from above, the distal portion of the right half airbag 12 is rolled up counterclockwise, while the distal portion of the left half airbag 14 is rolled up clockwise.

Figure 10:
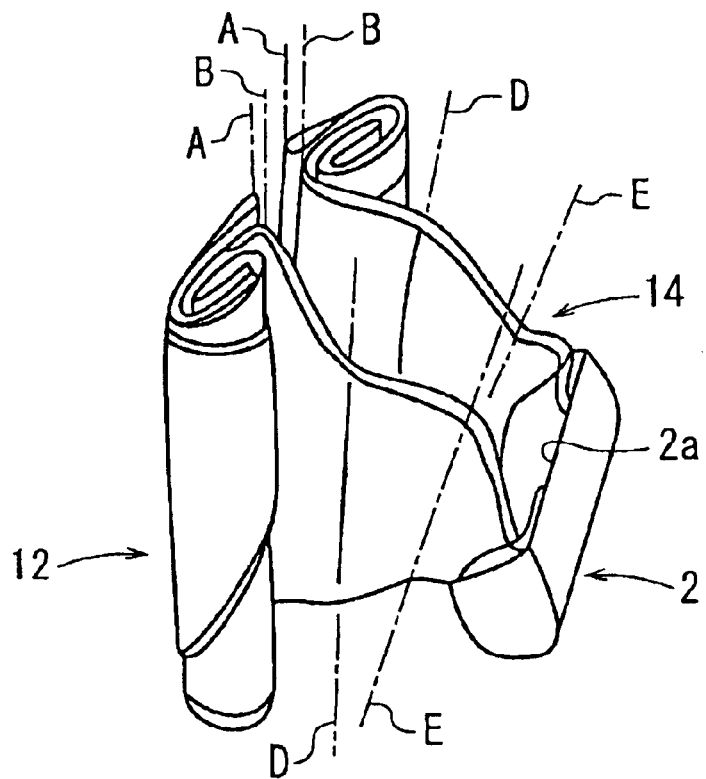
FIG. 10 is a perspective view showing the process of folding the airbag shown in FIG. 1(a)
Figure 11:
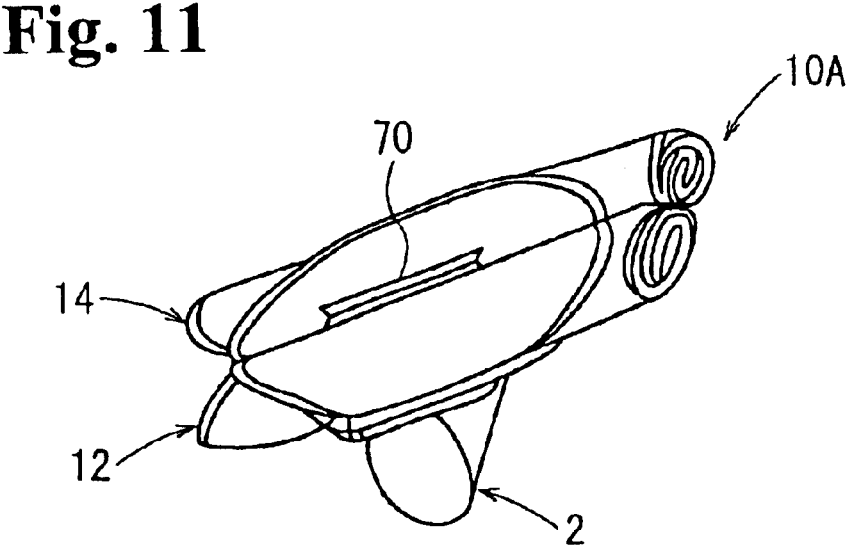
FIG. 11 is a perspective view showing the process of folding the airbag shown in FIG. 1(a)

As shown in FIGS. 9 and 10, the right half airbag 12 and the left half airbag 14 at the sides of the base portions from the fold lines B are folded into bellows (zigzag shape) along fold lines D and E between the fold lines B and the rear end 10e (not shown in FIGS. 9 and 10), and then are overlapped with a front opening 2a of the case 2. As shown in FIG. 11, the airbag 10A has primarily folded portions elongated vertically (substantially horizontally in FIG. 11).

The primary folded portions 10A are folded from the top and bottom ends thereof relative to the front opening 2a of the case 2, so that secondary folded portions are formed in a vertically compact state to become a finally folded airbag. The finally folded airbag is accommodated through the front opening 2a into the case 2. The case 2 is covered with the lid to close the front opening 2a. The top and bottom of the primary folded portion 10A may be rolled up or folded into bellows.

In the airbag device of the invention, in case of a vehicle collision, the gas from the inflator 56 flows through the communicating portion 16 into the right half airbag 12 and the left half airbag 14 to inflate the same at the front right and left sides of the occupant.

As described above, the airbag 10 is folded into the vertically elongated state to form the primary folded portions 10A, and is then secondarily folded into the finally folded airbag. Therefore, when the inflator 56 ejects the gas to the airbag, the right half airbag 12 and the left half airbag 14 are deployed from the secondary folded state, and are inflated vertically toward the occupant at a relatively initial stage of the inflation. As a result, a first contact area, i.e. an area of the airbag 10 that contacts the occupant first, is increased.

According to the embodiment, the distal portions of the right half airbag 12 and the left half airbag 14 are rolled up when the primary folded portions of the airbag 10 are formed. The right half airbag 12 is rolled up counterclockwise and the left half airbag 14 is rolled up clockwise when viewed from above. As a result, as shown in FIGS. 12 and 13, the airbag 10 is inflated such that the right half airbag 12 approaches and wraps the right side of the occupant thorax from the front right side of the occupant. The left half airbag 14 approaches and wraps the left side of the occupant thorax from the front left side of the occupant. As shown in FIGS. 14(a) and 14(b), the airbag 10 further wraps and receives the occupant head from the front left and right sides of the occupant.

According to the embodiment, the airbag 10 at the base portion sides from the fold lines B are folded into the bellows. Therefore, when the airbag 10 is inflated, the base portion sides are quickly inflated, and then the distal portions of the right half airbag 12 and the left half airbag 14 are inflated such that the distal portions wrap the occupant from the front left and right sides of the occupant.

In the airbag 10, when the right half airbag 12 and the left half airbag 14 are inflated from the folded state, one of the airbags 12 and 14 may be inflated faster than the other. In such a case, since the airbags 12 and 14 are connected with each other, the one of the airbags pulls the other of the airbags to facilitate the inflation of the airbags. Further, the right half airbag 12 and the left half airbag 14 are connected with the connecting portion 70 at the midsections thereof in the direction of the inflation. Therefore, the one of the airbags starts pulling the other of the airbags in the direction of the inflation from a relatively initial stage of the inflation. As a result, both the right half airbag 12 and the left half airbag 14 are inflated smoothly and substantially uniformly from the initial stage of the inflation.

Once the airbag 10 is completely inflated, the space 13 is formed between the distal ends of the right half airbag 12 and the left half airbag 14, and faces the occupant. The right half airbag 12 receives the right side of the occupant thorax, and the left half airbag 14 receives the left side of the occupant thorax. The space 13 faces the occupant around the breastbone, thereby reducing an impact around the breastbone.

A process of manufacturing the airbag 10 is as follows. As shown in FIG. 3(a), the seam 32 stitches the rear inner panel 18 and the front inner panel 22, and the seam 34 stitches the rear inner panel 18 and the front inner panel 24. The seam 36 stitches the rear outer panel 20 and the front outer panel 26, and the seam 38 stitches the rear outer panel 20 and the front outer panel 28. The seam allowances 44 between the rear inner panel 18 and the front inner panel 22 and the seam allowances 46 between the rear inner panel 18 and the front inner panel 24 are disposed outside the airbag in an assembled state.

As shown in FIG. 3(b), the seam 32 (32a and 32b) connects the rear inner panel 18 and the front inner panel 22 only at both ends of the seam allowance 44. An opening 60 is formed between the seams 32a and 32b for reversing the airbag.

A stitched assembly of the rear inner panel 18 and the front inner panels 22 and 24 and a stitched assembly of the rear outer panel 20 and the front outer panels 26 and 28 are overlapped with each other. At this time, surfaces to be exposed to the outside of the airbag face with each other. Then, edges of the stitched assemblies are stitched with the seams 30, 40, and 42, thereby obtaining an intermediate airbag product in a reversed state.

The intermediate airbag product is reversed through the opening 60 in the seam allowance 44. The seams 52 then connect the joint allowances 48 and 50 at the seam allowances 44 and 46 to complete the airbag 10. When the joint allowances 48 and 50 are stitched, the seam 52 closes the opening 60.

As described above, although the airbag 10 has the large and complicated outer surface, it is possible to efficiently use a plurality of relatively small panels to form the airbag.

In the embodiment, the seam allowance 44 between the rear inner panel 18 and the front inner panel 22 is joined to the seam allowance 46 between the rear inner panel 18 and the front inner panel 24, so that the right half airbag 12 and the left half airbag 14 are substantially connected. Thus, it is not necessary to use a tie panel in addition to the panels 18, 22, and 24 for connecting the right half airbag 12 and the left half airbag 14, thereby reducing a production cost of the airbag 10.

In the embodiment, the rear outer panel 20 of the communicating portion 16 has the pair of slits 54 for an inflator. The slits 54 hold the rod inflator 56 disposed in the communicating portion 16, thereby firmly attaching the airbag 10 to the inflator 56.

The intermediate airbag product may be difficult to reverse through a bent hole or openings for an inflator. In the embodiment, as described above, the seam allowance 44 is provided with the opening 60 for reversing the airbag product. Therefore, it is easy to reverse the intermediate airbag product through the opening 60 even in the case that the slits are formed as the openings for the inflator. When the joint allowances 48 and 50 are stitched, the seams 52 closes the opening 60. Therefore, the gas introduced into the right half airbag 12 and the left half airbag 14 from the inflator 56 does not leak through the opening 60.

Figure 17A:
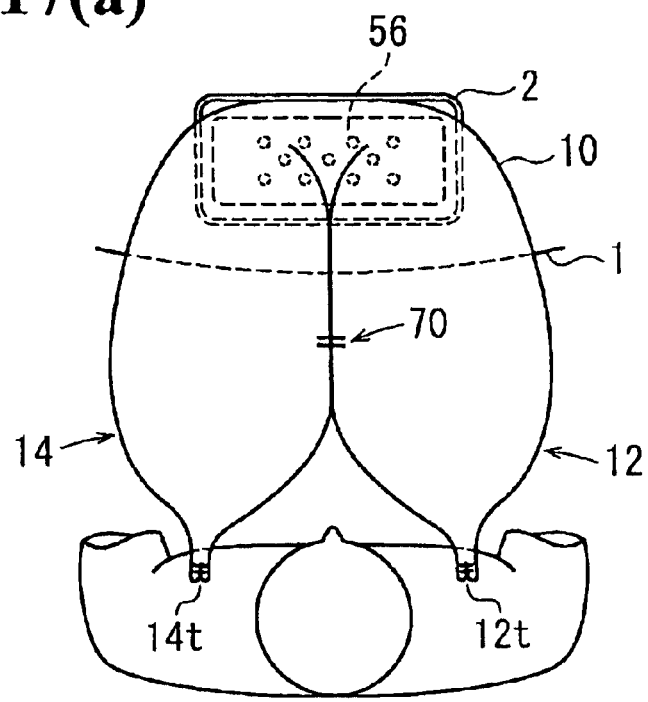
FIGS. 17(a) and 17(b) are plan views showing the process of inflating the airbag shown in FIG. 15.
Figure 17B:
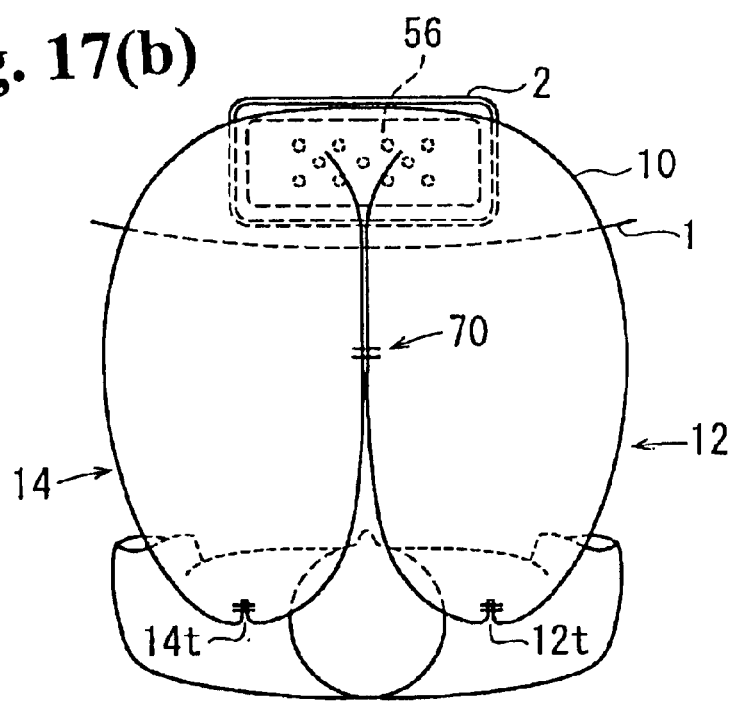

FIGS. 15 to 17(a) and 17(b) are views showing a process of inflating an airbag in an airbag device according to another embodiment. FIG. 17(a) shows a state that the distal ends of the left and right half airbags contact an occupant, and FIG. 17(b) shows the left and right half airbags in a completely inflated state.

Figure 15:
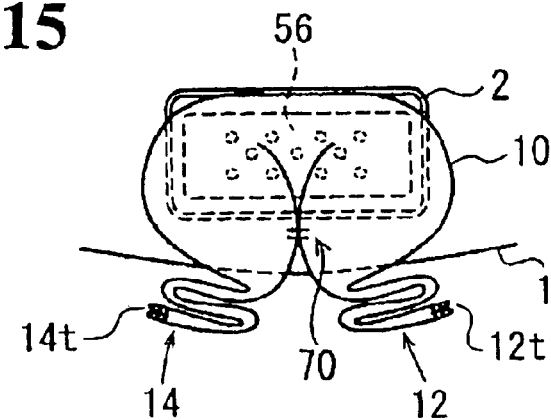
FIG. 15 is a plan view showing a process of inflating an airbag according to another embodiment of the present invention.
Figure 15:
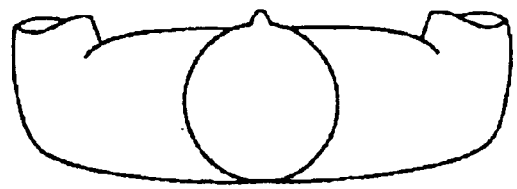
Figure 16:
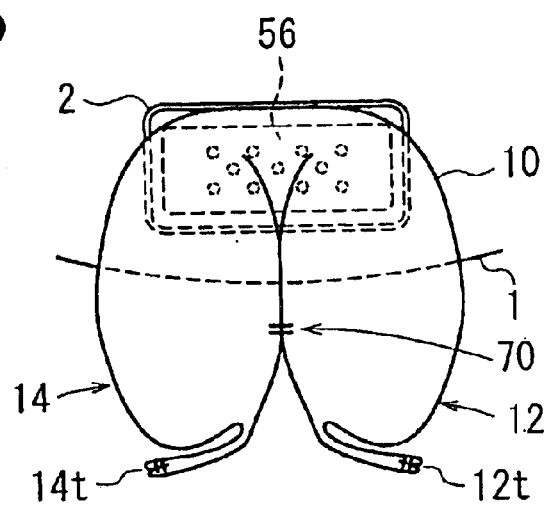
FIG. 16 is a plan view showing the process of inflating the airbag shown in FIG. 15.
Figure 16:
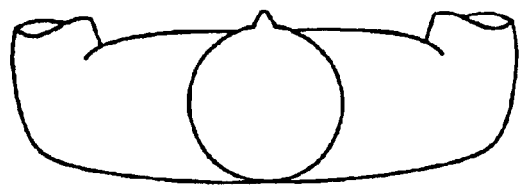

According to the embodiment, when the airbag 10 is folded, instead of rolling up, the right half airbag 12 and the left half airbag 14 are folded into bellows from the base portions to the distal portions to form the primary folded portions elongated vertically. As shown in FIG. 15, the right half airbag 12 and the left half airbag 14 are folded into the bellows to form the primary folded portions of the airbag 10 in which distal ends 12t and 14t are directed in opposite directions.

Then, the airbag 10 is folded to form the secondary folded portions to obtain the final folded airbag to be accommodated in the case 2 of the airbag device. The other features of the airbag device are the same as those in FIGS. 1 to 11, and common reference numerals in FIGS. 1 to 11 represent the same components in FIGS. 15 to 17(a) and 17(b).

Also in this embodiment, the airbag device is installed on the instrument panel 1. The airbag 10 has the primary folded portions elongated vertically, which is then folded to form the secondary folded portions to obtain the final folded airbag. Therefore, when the inflator 56 ejects the gas to the airbag, the right half airbag 12 and the left half airbag 14 are released from the secondary folded portions, and are inflated vertically toward the occupant in a relatively early stage, thereby increasing the first contact area, i.e. the area of the airbag 10 contacting the occupant first.

In the embodiment, the right half airbag 12 and the left half airbag 14 are folded into the bellows from the base portions to the distal portions as the primary folded portions. Therefore, the right half airbag 12 and the left half airbag 14 are released from the secondary folded portions and inflated toward the occupant such that the right half airbag 12 and the left half airbag 14 receive the front left and right sides of the occupant thorax.

In the embodiment, the right half airbag 12 and the left half airbag 14 are folded to form the primary folded portions in which the distal ends 12t and 14t are directed in opposite directions. Therefore, as shown in FIG. 17(a), when the right half airbag 12 and the left half airbag 14 are inflated in the final stage (inflated up to the distal ends 12t and 14t), the distal ends 12t and 14t of the right half airbag 12 and the left half airbag 14 are inflated to approach the occupant head from the front left and right sides of the occupant, thereby wrapping and receiving the occupant head from the front left and right sides of the occupant.

Figure 18A:
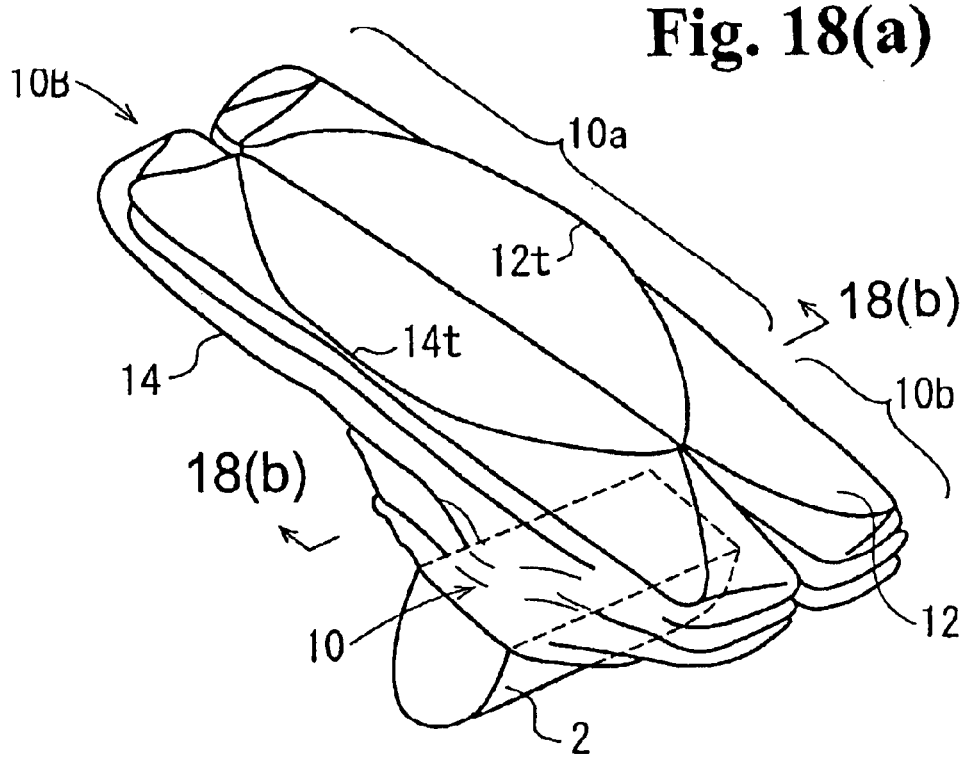

In the present invention, the top and bottom halves of the primarily folded portions may be folded separately to form the secondary folded portions. Accordingly, it is possible to adjust sizes of the top and bottom halves of the secondary folded portions. As shown in FIG. 18(a), for example, the airbag is folded to form primary folded portions 10B having top halves longer than bottom halves. The top halves and bottom halves are folded separately to form the secondary folded portions, so that the top halves of left and right half airbags can be inflated larger than the bottom halves thereof in the initial stage of the airbag inflation. As a result, the surfaces of the left and right half airbags face the occupant substantially vertically, thereby obtaining a large first contact area.

In the present invention, the folded airbag may have the bottom halves longer than the top halves, or may have the top and bottom halves having the same lengths, depending on an installing condition of the airbag device and the like.

Figure 19:
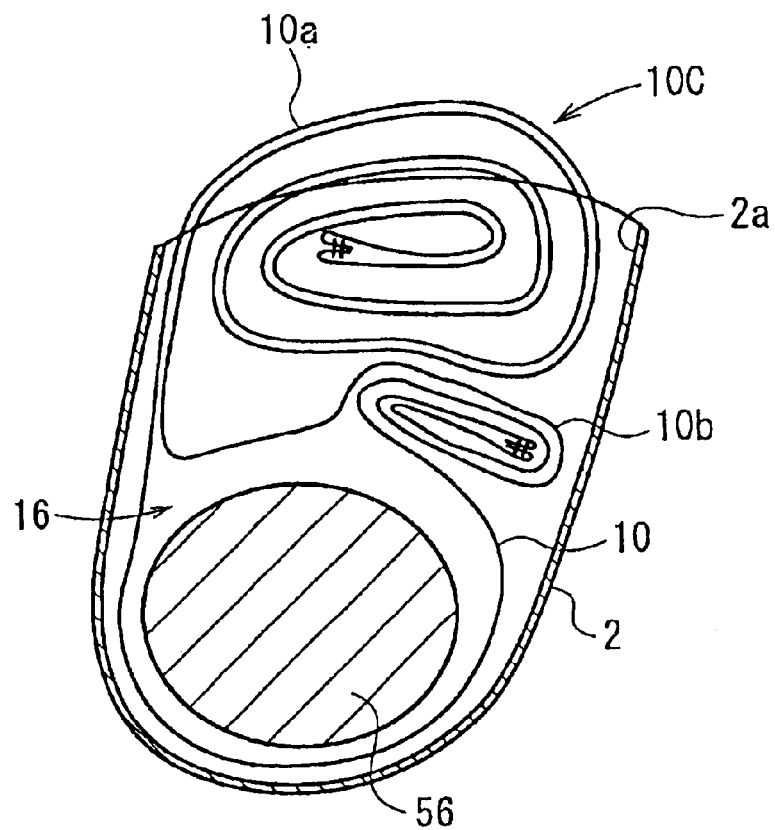
FIG. 19 is a sectional view of the airbag device shown in FIG. 18(a) in a final folded state.

When the secondary folded portions have the top halves longer than the bottom halves, it is preferable that the bottom halves are folded first, the top halves are folded next, and then the folded top halves are disposed on the folded bottom halves to complete a final folded airbag 10C as shown in FIG. 19. When such an airbag is inflated, the bottom halves are inflated to push up the top halves, thereby facilitating the inflation of the top halves.

Figure 18B:
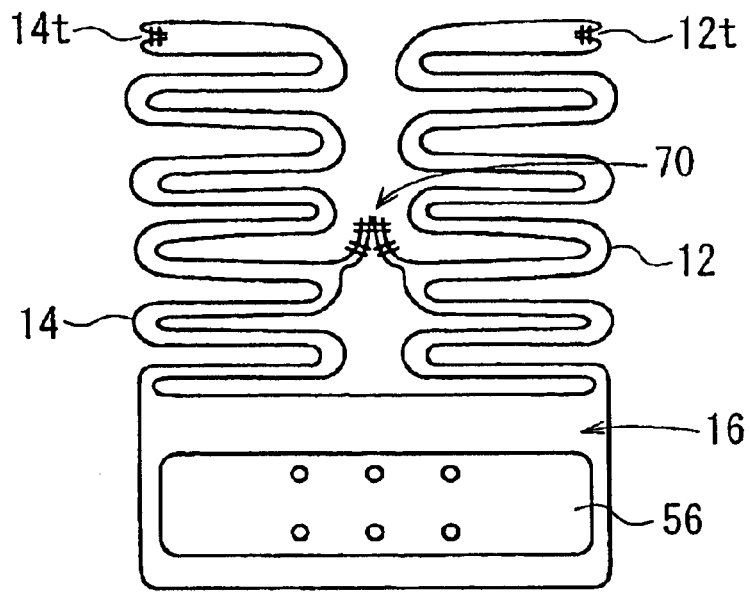

FIG. 18(a) is a perspective view of the primary folded portions 10B having the top halves longer than the bottom halves, and FIG. 18(b) is a sectional view taken along line 18(b)-18(b) in FIG. 18(a). FIG. 19 is a sectional view of the final folded airbag 10C in which the primary folded portions 10B are folded such that the top halves are disposed on the bottom halves.

In the airbag 10 shown in FIGS. 18(a), 18(b) and 19, the inflator 56 is disposed in the communicating portion 16 at the bottom of the airbag 10, and a bottom end of the communicating portion 16 and the inflator 56 are connected with the case 2.

In the embodiment, in a state that the right half airbag 12 and the left half airbag 14 are unfolded in a flat state with side surfaces thereof overlapped, the right half airbag 12 and the left half airbag 14 are folded into bellows from the tops to the bottoms to form the primarily folded portions 10B elongated vertically (substantially horizontally in FIG. 18(a)). In this case, the case 2 is disposed below a center of the primary folded portions 10B in the vertical direction such that each of the primary folded portions 10B has a top half 10a (to be folded) longer than a bottom half 10b. The primary folded portions 10B preferably have the top halves 10a 1.5 to 2.5 times longer than the bottom halves 10b.

The right half airbag 12 and the left half airbag 14 are folded into the primary folded portions 10B in which the top ends 12t and 14t are directed in opposite directions.

The bottom halves 10b are rolled up first, the top halves 10a are rolled up next, and then the rolled-up top halves 10a are disposed on the rolled-up bottom halves 10b to complete the final folded airbag 10C. The bottom halves 10b are rolled up such that the rear surfaces (facing the case 2) of the bottom halves 10b are rolled up, while the top halves 10a are rolled up such that the front surfaces (facing away from the case 2) of the top halves 10a are rolled up. Accordingly, the bottom halves 10b are inflated while pressing the folded top halves 10a, and the top halves 10a are smoothly inflated without hitting a vehicle component such as a windshield (not shown).

In the embodiment, the final folded airbag 10C is accommodated into the case 2, and the front opening 2a of the case 2 is closed with a cover such as a lid (not shown). The other features of the airbag device is the same as those in FIGS. 1 to 3, and common reference numerals in FIGS. 1 to 3 and FIGS. 18 and 19 represent the same components.

In the airbag device, the airbag 10 is folded into a vertically elongated shape, i.e. the primary folded portions 10B, and the primary folded portions 10B are folded to form the secondary folded portions to be the final folded airbag 10C. Therefore, when the inflator 56 supplies the gas into the final folded airbag 10C, the right half airbag 12 and the left half airbag 14 are released from the secondary folded portions vertically toward the occupant in a relatively initial stage. Accordingly, it is possible to increase the first contact area, i.e. the area of the airbag 10 contacting the occupant first.

In the airbag device, when the final folded airbag 10C is inflated, the top halves 10a and bottom halves 10b of the airbag 10 are inflated while the folded bottom halves 10b disposed under the top halves 10a pushes up the top halves 10a, thereby facilitating the inflation of the top halves 10a. The airbag 10 is folded to form the primary folded portions such that the top halves 10a are longer than the bottom halves 10b. Accordingly, it is possible to inflate the top halves 10a larger than the bottom halves 10b in the initial stage of the airbag inflation. As a result, the surfaces of the right half airbag 12 and the left half airbag 14 face the occupant substantially vertically, thereby increasing the first contact area.

In the embodiment, the right half airbag 12 and the left half airbag 14 are folded into the bellows from the bottoms to the tops to form the primary folded portions. Therefore, the right half airbag 12 and the left half airbag 14 are released from the secondary folded portions toward the occupant such that the right half airbag 12 and the left half airbag 14 receive the front left and front right sides of the occupant thorax. The right half airbag 12 and the left half airbag 14 are folded to form the primary folded portions in which the top ends 12t and 14t are directed in opposite directions. Therefore, when the right half airbag 12 and the left half airbag 14 are inflated to the final stage, the top ends 12t and 14t of the right half airbag 12 and the left half airbag 14 are inflated to approach the occupant head from the front left and front right sides of the occupant, thereby allowing the airbag 10 to wrap and receive the occupant head.

It is possible to fold the airbag with a method other than the methods described above to form the primary folded portion such that the top half is longer than the bottom half. It is also possible to separately fold the top and bottom halves of the primary folded portion with a method other than the methods described above.

The present invention is not limited to the embodiments shown in the drawings. For example, the right half airbag 12 and the left half airbag 14 communicate with each other at the bottom. Alternatively, both airbags may be separated. In addition, the right half airbag and the left half airbag may be inflated with different inflators. Furthermore, the midsections of the right half airbag and the left half airbag may be connected by, for example, a panel, a string, or a net. In the present invention, the right half airbag and the left half airbag may be symmetric or asymmetric. In addition, the right half airbag and the left half airbag may have the same volume or different volumes.

Figure 20:
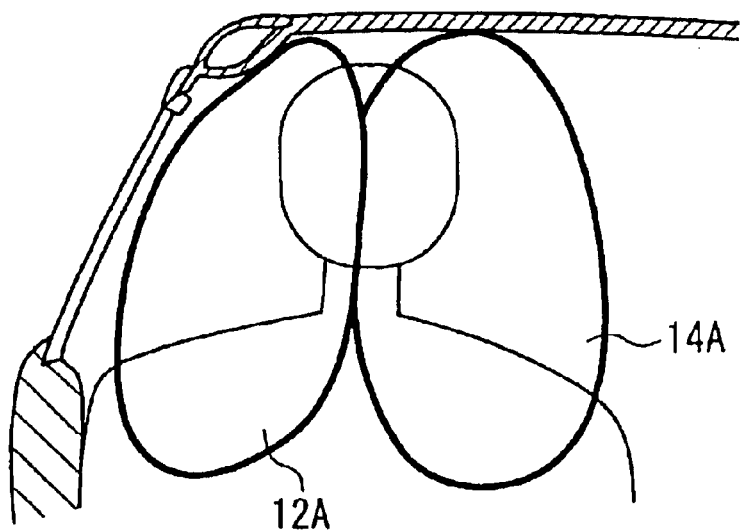
FIG. 20 is a view showing an airbag according to a still further embodiment.

As shown in FIG. 20, in the present invention, a top portion of the airbag adjacent to an A pillar (a right half airbag 12A in FIG. 20) may be inclined inwardly so as not to touch the A pillar, a windshield, or a side window.

Figure 21:
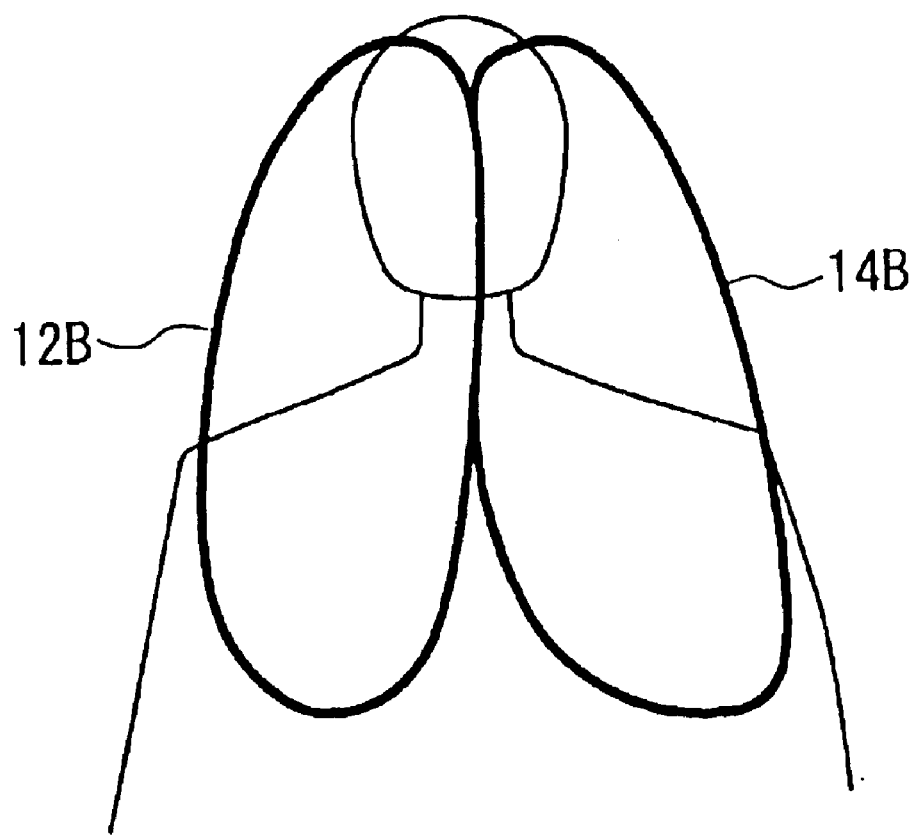
FIG. 21 is a view showing an airbag according to a still further embodiment.

As shown in FIG. 21, in the present invention, the airbags (the right half airbag 12B and a left half airbag 14B) may have top portions having horizontal widths gradually decreasing in an upward direction.

As described above, the present invention provides the airbag device having the left and right half airbags with a large first contact area relative to the occupant. In addition, the present invention provides the airbag and the airbag device in which the left half airbag receives the left side of the occupant thorax, the right half airbag receives the right side of the occupant thorax, and the space between the both airbags faces the occupant around the breastbone. Furthermore, the present invention provides the airbag and the airbag device in which both the left and right half airbags are inflated smoothly and substantially uniformly from the initial stage of the inflation.

While the invention has been explained with reference to the specific embodiments of the invention, the explanation is illustrative and the invention is limited only by the appended claims.

What is claimed is:

1. An airbag device for protecting an occupant, comprising;
an airbag including a left half airbag to be inflated at a left side of the occupant and having a distal end and a base portion, and a right half airbag to be inflated at a right side of the occupant and having a distal end and a base portion, said distal ends of the left and right half airbags being separated from each other to form a space therebetween facing the occupant when the airbag is inflated, said left and right half airbags having primary folded portions in which each of the left and right half airbags is folded laterally and partly overlapped between the distal end and the base portion to have an elongated vertical form, and secondary folded portions in which the elongated vertical form in each of the left and right half airbags is folded to reduce an elongated distance thereof to form a final folded state, and
an inflator for inflating the airbag.

2. An airbag device according to claim 1, wherein said primary folded portions have a left rolled up portion at the half airbag rolled up clockwise viewed from above, and a right rolled up portion at the right half airbag rolled up counterclockwise viewed from above.

3. An airbag device according to claim 1, wherein said primary folded portions have portions folded in bellows.

4. An airbag device according to claim 1, wherein said primary folded portions have top and bottom halves to be folded separately to form the secondary folded portions, respectively.

5. An airbag device according to claim 4, wherein said primary folded portions have the top halves larger than the bottom halves.

6. An airbag according to claim 1, wherein said base portions of the left and right half airbags are connected together, said inflator inflating the left and right half airbag.

7. An airbag device according claim 1, wherein said left and right half airbags have opposing surfaces connected with each other with connecting portions at midsections thereof in a direction that the airbag is inflated.

8. An airbag device according to claim 7, wherein said left and right half airbags have distal portions from the connecting portions to the distal ends thereof folded in opposite directions along first fold lines extending along the connecting portions in a vertical direction, middle portions between the first fold lines and second fold lines situated between the first fold lines and the base portions of the left and right half airbags, said middle portions being folded along third fold lines extending in a middle of the middle portions in the vertical direction such that the third fold lines move away from each other, said distal and middle portions being overlapped and rolled, and base sides between the second fold lines and the base portions folded into bellows.

9. An airbag according to claim 1, wherein at least one of said left half airbag and said right half airbag includes an inclined upper portion.

10. An airbag according to claim 1, wherein at least one of said left half airbag and said right half airbag includes a portion having a thickness gradually decreasing upwardly when the left half airbag and the right half airbag are inflated.

11. An airbag according to claim 1, wherein said distal ends of the left half airbag and the right half airbag are separated by a distance of 150–350 mm when the left half airbag and the right half airbag are deployed.

* * * * *